Patented Apr. 14, 1931

1,801,052

UNITED STATES PATENT OFFICE

JOSEPH V. MEIGS, OF BROOKLYN, NEW YORK, ASSIGNOR TO MEIGSOID CORPORATION, OF JERSEY CITY, NEW JERSEY, A CORPORATION OF NEW JERSEY

RESINOUS CONDENSATION PRODUCT AND PROCESS OF MAKING SAME

No Drawing. Application filed February 6, 1923, Serial No. 617,399. Renewed December 6, 1928.

The present application, like my preceding applications Nos. 517,721 and 575,648, filed Nov. 25, 1921 and July 17, 1922, respectively, deals with the production of bodies adapted for molding purposes and as substitutes for hard rubber, resins, shellac, celluloid and allied materials: and the fabrication of chemical products for other purposes all as will be hereinafter described and as claimed.

As raw materials the present invention may employ (1) carbohydrates as for example the sugars, dextrines, starches or celluloses, or derivatives of carbohydrates or other carbohydrate- containing or yielding materials as for example glucosides, or the residue from the refining of sugars, such for example as molasses: crude sugars or syrup as for example crude or partially refined cane or beet sugar juice.

(2) Phenols as for example ordinary phenol or carbolic acid; its homologues as for example the cresoles and xylenols; naphthols and their homologues and other members of the phenol genus.

(3) Organic acids as for example, salicylic acid, lactic acid, citric acid etc. and other organic acids as for example acetic acid. In addition the esters or salts of acid bodies or acids may be employed.

(4) Basic or alkaline bodies particularly $NH_2$ containing bodies as for example aniline, ammonia, isoamylamine, hydroxylamine. Hexamethylenetetramine and other similarly-functioning bodies: metallic hydroxides as for example sodium hydroxide, aluminium hydroxide and the like are also included.

(5) Inorganic acids.

The products of the present invention are furthermore intended for use, among other applications, as binders for comminuted fibrous or granular filling material or continuous filling material in the manufacture of hot-molded articles such for example as electrical insulation, phonograph records and the like; as varnishes and enamels.

The reaction between a carbohydrate, a base and an acid or mixture of acids may lead to the production of bodies freely soluble in water and bodies not freely soluble in water. The present invention is more especially concerned with the production and manipulation of those bodies not freely soluble or insoluble in water.

The production of such difficultly-soluble bodies, as the result of the interaction of a carbohydrate and an acid may be facilitated by the presence of a basic, base-containing or base-yielding body as for example ammonium chloride, aniline, aniline oxalate, aniline and potassium hydroxide etc. The base-containing body may be merely basic in nature as for example aniline, or it may comprise the salt of a base as for example aniline oxalate.

Examples

A. REACTIONS BETWEEN CARBOHYDRATES, BASES AND ORGANIC ACIDS (1) *Glucose, rosin, aniline and water*

| | |
|---|---|
| Glucose (technical) | 80 gr. |
| Water | 60 gr. |
| Rosin | 60 gr. |
| Aniline | 60 cc. |

These materials were refluxed for five hours, settled, the aqueous matter drawn off, and the non-aqueous, difficultly water soluble, resinous reaction product thereby isolated. This upon melting and continued heating became infusible.

(2)

| | |
|---|---|
| Glucose 70%<br>Dextrin 30% | 180 gr. |
| Phthalic acid | 83 gr. |
| Aniline | 20 cc |
| Water | 100 cc. |

This mixture was refluxed for half an hour, whereupon the reaction mixture was boiled with water and filtered. The residue on the filter was black in color, resilient, not soluble in water and could not be melted to a liquid consistency.

Apparently the initial fusible reaction product had been rapidly polymerized by the relatively strong acid present in the presence of the base. The use of the product as rubber substitute is contemplated.

(3)

| | |
|---|---|
| Glucose 70% } Dextrin 30% } | 180 gr. |
| Salicylic acid | 138 gr. |
| Aniline | 20 cc. |
| Water | 100 cc. |

This mixture was refluxed three quarters of an hour and the water insoluble product resembled that obtained with phthalic acid.

(4)

| | |
|---|---|
| Glucose 70% } Dextrin 30% } | 180 gr. |
| Lactic acid | 60 gr. |
| Aniline | 10 gr. |
| Water | 50 gr. |

This mixture was refluxed one and one quarter hours and then extracted with hot water. A large yield of difficultly-water-soluble product was obtained in the form of black, resilient granules. The product was not soluble in water, alcohol, ammonium or sodium hydroxide solutions and was infusible. Its use for plastic or other purposes is contemplated.

(5)

| | |
|---|---|
| Glucose | 180 gr. |
| Ammonium citrate | 120 gr. |
| Water | 100 cc. |

This combination was refluxed for forty minutes. The reaction flask then contained a large amount of black, water insoluble material having resilient properties. Its use as plastic material or for other purposes is contemplated.

The reactions as described above may be modified by working at lower temperatures and with lower acid concentrations and by other means as for example employing the salt or ester of the acid and slowly decomposing or hydrolyzing the same during the course of the reaction. In general the more vigorous the reaction, and the longer it continues, the more infusible and insoluble (in alcohol and similarly acting solvents) the water insoluble reaction products may become. The basic body may greatly accelerate, (or initiate and accelerate) the reaction.

It is probable that the acid present may exert a condensing action on the products formed, this condensing action tending toward insolubility and infusibility. The difficultly-water-soluble products of the reaction may be mixed with filling material and heated in molds to produce various molded bodies.

As will be noted from the foregoing examples, the reaction is not limited to a particular organic acid. When the resinous substance known as rosin (which contains abietic acid) is used, a resinous product may be obtained which, as noted, although initially fusible, tends to become infusible on further heating. When the stronger acids (e. g. phthalic and salicylic acids) are employed, bodies having, as stated, rubber-like characteristics may be produced.

In the preferred form of the present invention, the type of acidic material employed is preferably phenolic in character, as herewith shown.

B. REACTIONS OF PHENOLS WITH CARBOHYDRATES

Phenols, being in many or most cases very weak organic acids may react with carbohydrates in the presence of a base or base containing body in such a way that it may be easier so to control the reaction (especially reactions carried out in the neighborhood of or above 100° C.) that initially fusible or resinous (or liquid) difficultly-water-soluble bodies may be in the first instance produced than is the case where relatively strong organic acids are employed. It may indeed be sometimes found desirable to increase the acid strength of a mixture containing a phenol, a carbohydrate and a basic body, by adding thereto an acid stronger than the phenol, in order to accelerate the formation of resinous or plastic bodies. This may be accomplished by combining such acid body with the basic body to form a salt. Such salts are included in the term base containing and base-yielding bodies.

*Examples*

(6)

| | |
|---|---|
| Sucrose | 300 gr. |
| Carbolic acid | 100 gr. |
| Ammonium chloride | 80 gr. |
| Water | 80 gr. |

These bodies were boiled together under reflux two and one-half hours. A heavy deposit of black, elastic, difficultly water soluble, thermoplastic material was produced. This, after washing with water became infusible upon heating.

(7)

| | |
|---|---|
| #1 { Glucose | 360 gr. |
| #1 { Carbolic acid | 170 gr. |
| #1 { Water | 80 cc. |
| #2 { Oxalic acid | 5 gr. |
| #2 { Aniline | 9 cc. |
| #2 { Water | 20 cc. |

Mixture 1 was boiled until clear. No. 2 was then added and the whole refluxed for five hours. After setting, 350 gr. of water soluble syrup and 210 gr. of oily condensation product were separated in a separatory funnel. To the aqueous product or syrup, 20 cc. of aniline were added and refluxing continued, to see whether the aniline would induce the further formation of resinous (i. e. difficultly-water-soluble) bodies. Refluxing was started again and when it had proceeded an hour, it was noted that the reaction mixture was becoming very thick. On pouring the reaction mixture into the water, the presence of a large yield of black, difficultly-water-soluble or resinous reaction product was observed. This was added to the original oily difficultly-water-soluble reaction product.

With or without admixture with filling material, the resinous product prepared as above became infusible when heated to about 130° C. and may be employed to produce molded articles. Such a process may be executed by mixing a reaction product prepared as for example by a method such as is described above with filling material as for example wood flour, carbon black, kieselguhr and the like and heating in a mold under pressure to a suitable temperature as for example 125°–150° C. until the requisite degree of strength, infusibility and hardness is attained.

(8)

| | |
|---|---|
| Glucose | 360 gr. |
| Phenol | 90 gr. |
| Aniline | 90 gr. |
| Water | 100 gr. |

This mixture was refluxed for 8 hours. The reaction product was washed with an equal volume of hot water and the residue (the resinous or difficultly-water-soluble reaction products) was dehydrated by heating to 100° C. 360 grams of product were thus obtained, which on heating to 130° C. or higher became infusible. Color (in mass) was black.

(9)

| | |
|---|---|
| Glucose | 180 gr. |
| Water | 100 gr. |
| KOH | 2 gr. |
| Aniline | 20 cc. |
| Phenol | 80 gr. |

The above materials were refluxed for 5 hours. The reaction products were settled, the lower aqueous layer drawn off and 140 gr. of crude difficultly-water-soluble or resinous product obtained. This was a very viscous liquid, brown in thin layers. It reduced Fehling's solution and formed a silver mirror with ammoniacal silver nitrate solution. It restored the pink color to fuchsin solution previously decolorized with sulphur dioxide.

Use of a condensing agent as applied to the difficultly-water-soluble reaction products of a carbohydrate, a phenol and a base containing body.

(10)

| | | |
|---|---|---|
| #1 | Glucose | 360 gr. |
| | Carbolic acid | 170 gr. |
| | Water | 150 gr. |
| #2 | Aniline | 30 cc. |
| | Water | 50 cc. |
| | Oxalic acid | 4 gr. |

No. 1 was added to No. 2 and the whole refluxed for three and one half hours. On settling and drawing off the aqueous syrup, 300 grams of difficultly-water-soluble or resinous product were obtained. To this, 5% by weight of hexamethylenetetramine were added and the mixture heated. At 160° C. infusibility developed rapidly. The product was black in mass, yellowish-brown in films and heavier than water.

As will be noted from Examples 6 to 10, the reaction between a carbohydrate, a phenol and a reactive nitrogen base (e. g. aniline) may in the preferred form of the present invention take place in two stages (a) the production of an initial reaction product, preferably a fusible one, and (b) the conversion of this initial fusible reaction product into a less easily fusible, or infusible, form, by heating, by itself or in the presence of condensing agents, to elevated temperatures, as for example 130 degrees centigrade or higher.

C. REACTIONS BETWEEN CARBOHYDRATES AND NITROGEN BASES

Carbohydrates as for example glucose appear to react readily with amino compounds as for example aniline, with the production of useful reaction products. The reaction may be catalyzed by acids and may lead as indicated in subsequent examples to the formation of bodies adapted for use as plastics or for other purposes.

*Examples*

(11)

| | |
|---|---|
| Glucose | 360 gr. |
| Aniline | 150 gr. |
| Water | 125 cc. |
| Oxalic acid | 5 gr. |

This combination was refluxed 2 hours, and then washed with water.

The difficultly-water-soluble residue was a black, semi-solid. Its use as accelerator of the vulcanization of rubber is contemplated. It became rapidly infusible on heating, particularly above 125° C.

(12)

| | |
|---|---|
| Glucose | 360 gr. |
| Aniline | 150 gr. |
| Water | 100 gr. |
| Phenol | 20 gr. |

Here it will be noted that the phenol is in very small proportion to the aniline.

This mixture was refluxed for three hours. The reaction product was diluted with water and a reddish brown, difficultly-water-soluble gummy or resinous mass was precipitated. On heating this resinous product it slowly hardened particularly above 100° C. On treatment with ammonium hydroxide and subsequent heating the development of hardness and infusibility was much more rapid.

Ammonia and other nitrogenous or basic bodies may exert a profound condensing action on the difficultly-water-soluble products of reaction of saccharides, bases and acids (as for example phenols). Among such condensing agents, hexamethylenetetramine may be mentioned.

The phrase "a nitrogenous-base-containing body" or equivalent phrase may denote the mere basic body itself, or mixture of basic bodies; and may also denote substances containing or yielding a basic body, as for example salts thereof.

If desired the products of the present invention may be treated with condensing agents. These may be basic as for example ammonia or derivatives thereof as for example hydroxylamine, hexamethylenetetramine and other condensing agents.

As commercial materials the products of the present invention may be handled in diverse forms.

The difficultly-water-soluble initial reaction products may be marketed as such or dissolved in solvents, for use as impregnating or coating varnishes of the stoving or baking type.

Or they may be partially hardened, alone or in admixture with filling material, by means of heat, or heat and condensing agents, and marketed as solid or semi-solid plastic material (molding compounds). That is to say the hardening of the difficultly-water-soluble products may not necessarily be carried to the point where no further hardening takes place, but, if desired, to a partially hardened condition, as for example in the presence of filling material. In such partially hardened condition, such products may be preferably still capable of molding under heat and pressure (hot molding) to produce molded articles adapted for diverse uses as for example hard electrical insulation and other applications.

Oxidizing agents may be included among the condensing agents that may be employed, as for example atmospheric oxygen. The term condensing agent may mean an agent incorporated with or acting upon the body in question, the use of which is intended to cause or accelerate the development of hardness, strength and (or) infusibility.

When first produced by the interaction of a carbohydrate, an acid (e. g. a phenol) and a base (e. g. a nitrogen base), the difficultly-water-soluble products of such reaction may possess some or all of the physical and chemical properties enumerated below, viz:

(1) Reduce Fehling's solution.
(2) Form a silver mirror with ammoniacal silver nitrate solution.
(3) Restore the pink color to fuchsin decolorized by sulphur dioxide.
(4) React with ammonia, hexamethylene and other basic bodies.
(5) React with acid chlorides, as benzoyl chloride etc.
(6) React with nitric acid.
(7) Dissolve in cold concentrated sulphuric acid.
(8) At least partly decolorized or bleached by the action of reducing agents e. g. heating with alcohol and zinc dust.
(9) Decolorize dilute potassium permanganate solution.
(10) Decolorize bromine water.
(11) Give odor of phenylisocyanide on heating with alkali.
(12) Contain nitrogen as shown by elementary analysis.
(13) When boiled with dilute acids and the vapor allowed to impinge upon paper moistened with aniline acetate the latter assumes a violet color.
(14) Complete or partial solubility in NaOH solution.
(15) Complete or partial solubility in alcohol.

As the hardening or condensing action proceeds the chemical and physical reactivity of the product may decrease with a consequent decrease in the number of characteristic properties. Nevertheless even in the intermediate and final stages, the product may retain properties as follow:

(1) Contain nitrogen.
(2) When boiled with dilute acids and the vapors allowed to impinge on paper moistened with aniline acetate, the latter assumes a violet color.
(3) Substantially insoluble in alcohol.
(4) Color in mass, black.
(5) Heavier than water.
(6) Surface black or dark blue and shiny or lustrous especially when molded in smooth molds.
(7) Infusibility to a liquid state.

The properties listed immediately above refer more especially to the product in its late-intermediate or final stages of hardening.

To recapitulate, the present invention embraces the preparation of materials suitable for plastic or other purposes by the interaction of carbohydrates, nitrogenous material as for example nitrogen bases, and acids, particularly phenols.

The difficulty-water-soluble products of such reaction may be mixed with filling material and the whole molded under the influence of pressure and heat, and (or) condensing agents; or may be utilized in other ways.

Although in the preferred form of the present invention as will be noted, ammonia or a primary amine may be used, the invention is not limited to such bodies, as I may employ any suitable reactive nitrogen base which will react with a carbohydrate under the conditions described, as for example in the presence of a phenol. The phrase "reactive nitrogen base" is employed herein to characterize the nitrogenous material that may be employed.

What I claim is:

1. The process of making a resinous product which comprises reacting a carbohydrate with a reactive nitrogen base and a free organic acid.

2. The process of making a resinous product which comprises reacting a carbohydrate with a reactive nitrogen base and organic acidic material and subsequently heating said resinous product to render it infusible.

3. The process which comprises reacting a monose with a reactive nitrogen base and a phenol, whereby a resinous body is obtained.

4. The process which comprises reacting a carbohydrate with a primary amine and a phenol whereby resinous material is produced.

5. The process which comprises reacting a carbohydrate with a primary amine and a phenol, whereby a fusible resinous body is produced, thereafter incorporating a hardening agent and heating, whereby an infusible resinous product is obtained.

6. Process which comprises reacting a carbohydrate, a primary amine and a phenol, whereby resinous material is formed, and thereafter heating the same to cause it to assume its infusible form.

7. The process of making a synthetic chemical product which comprises reacting dextrose with a reactive nitrogen base and a phenol.

8. The process of making a synthetic chemical product which comprises reacting dextrose with a reactive nitrogen base and a phenol and thereafter incorporating a condensing agent.

9. The process of making a product adapted for use as insulating or other material which comprises reacting dextrose with a reactive nitrogen base and a phenol, whereby a product difficultly soluble in water is formed and subsequently heating the same to render it infusible.

10. The process of making a product adapted for molding or other purposes which comprises reacting dextrose with a phenol and aniline, whereby products difficultly soluble in water are formed.

11. The process of making a product adapted for insulating or other purposes which comprises reacting dextrose with a phenol and aniline, whereby a product difficultly soluble in water is formed and heating the same to render it infusible.

12. Resinous material, containing the resinous reaction products of a monose, a reactive nitrogen base and a phenol, reacted at 100 degrees centigrade, or above.

13. Chemical product, containing the resinous reaction products of a carbohydrate, a primary amine and a phenol.

14. Chemical product, containing the resinous reaction products of dextrose, a reactive nitrogen base and a phenol.

15. Chemical product, containing the resinous reaction products of dextrose, aniline and a phenol.

16. The resinous reaction product of a carbohydrate, a phenol and a reactive nitrogen base, capable of reducing Fehling's solution.

17. The resinous reaction product of a carbohydrate, a phenol and a reactive nitrogen base capable of forming a silver mirror with ammoniacal silver nitrate solution.

18. Resinous material, containing the reaction products of a carbohydrate, a reactive nitrogen base and a phenol and capable of becoming infusible when heated with hexamethylenetetramine.

19. Infusible resinous material comprising the product of the action of a hardening agent on resinous material resulting from reaction between a carbohydrate, a primary amine and a phenol.

20. Resinous material, comprising the reaction product of a carbohydrate, a primary amine and a phenol and capable of becoming infusible when heated with a methylene hardening agent.

21. The process of making a resinous product which comprises reacting a carbohydrate with a reactive nitrogen base and a phenol whereby resinous material is formed and subsequently heating the same to render it infusible.

22. The process which comprises reacting a carbohydrate with a reactive nitrogenous substance and a phenol to produce resinous material.

23. Resinous product comprising filling material and the reaction product of a carbohydrate, a reactive nitrogenous substance and a phenol.

24. The process which comprises reacting a monose with a phenol and a substance containing the $-NH_2$ radical, whereby resinous material is produced.

25. The process which comprises reacting a monose with a phenol and a substance containing the $-NH_2$ radical, whereby resinous material is produced, and heating the latter, whereby it is hardened.

26. The process which comprises reacting a monose with a phenol and a substance containing the $-NH_2$ radical, whereby resinous material is produced, and heating the latter to render it infusible.

27. The process which comprises reacting a carbohydrate with a reactive nitrogenous body and a phenol, whereby resinous material is produced, incorporating filling material to produce a composite product, and heating the latter under pressure to produce a shaped article.

28. The process of producing a plastic resinous material capable of being hardened which comprises reacting a carbohydrate with a substance comprising a reactive basic body in the presence of a phenol.

29. The process of producing a plastic resinous material which comprises reacting a carbohydrate with a reactive basic body in the presence of a phenol whereby resinous material is formed and heating the latter whereby it is hardened.

30. The process of reacting a carbohydrate with a reactive basic body in the presence of a phenol whereby resinous material is produced and incorporating therewith a hardening agent.

31. The process of making a plastic resinous material capable of being hardened which comprises reacting dextrose with a reactive basic body in the presence of a phenol.

32. The process of producing a chemical product which comprises reacting a carbohydrate with a primary aromatic amine in the presence of a phenol, whereby resinous material is produced.

33. The process of making a chemical product which comprises reacting dextrose with a primary aromatic amine in the presence of a phenol whereby resinous material is produced.

34. The process of making a resinous material capable of becoming hard and infusible when heated, with or without hardening agents, which consists in heating together a carbohydrate, a reactive basic body and a phenolic body to effect a condensation reaction between the carbohydrate and the other ingredients.

35. The process of making a resinous material capable of becoming hard and infusible when heated, with or without hardening agents, which consists in heating together a monose, a reactive basic body and a phenolic body to effect a condensation reaction between the monose and the other ingredients.

36. The process of making a resinous material capable of becoming hard and infusible when heated, with or without hardening agents, which consists in heating together dextrose, a reactive basic body and a phenolic body to effect a condensation reaction between the dextrose and the other ingredients.

37. The process of making a plastic resinous material which comprises mixing a free organic acid and a nitrogenous substance containing the $-NH_2$ radical with a carbohydrate and heating the ingredients.

38. The process of making a plastic resinous material which comprises reacting dextrose with aniline and phenol.

JOSEPH V. MEIGS.